US007114410B2

(12) United States Patent
Nagasawa (10) Patent No.: US 7,114,410 B2
(45) Date of Patent: Oct. 3, 2006

(54) SELECT SYSTEM FOR AN AUTOMATIC TRANSMISSION

(75) Inventor: Kunihiro Nagasawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 360 days.

(21) Appl. No.: 10/603,834

(22) Filed: Jun. 26, 2003

(65) Prior Publication Data

US 2004/0025615 A1 Feb. 12, 2004

(30) Foreign Application Priority Data

Jun. 28, 2002 (JP) ............................. 2002-189359

(51) Int. Cl.
*B60K 20/00* (2006.01)
*B60K 17/04* (2006.01)
*G05G 9/00* (2006.01)
(52) U.S. Cl. ............... 74/473.18; 74/473.1; 74/473.12; 74/473.24; 74/471 XY
(58) Field of Classification Search ............... 74/473.1, 74/473.12, 473.13, 473.14, 473.15, 473.18, 74/473.24, 473.25, 471 XY, 335
See application file for complete search history.

(56) References Cited

U.S. PATENT DOCUMENTS

| 5,622,079 | A | * | 4/1997 | Woeste et al. ................ 74/335 |
| 5,845,535 | A | * | 12/1998 | Wakabayashi et al. ... 74/473.18 |
| 6,196,080 | B1 | * | 3/2001 | Lee .......................... 74/473.18 |
| 6,230,579 | B1 | * | 5/2001 | Reasoner et al. ........ 74/473.18 |
| 6,295,886 | B1 | * | 10/2001 | Russell .................... 74/473.18 |
| 6,325,196 | B1 | * | 12/2001 | Beattie et al. ........... 192/220.4 |
| 6,401,564 | B1 | * | 6/2002 | Lee .......................... 74/473.18 |
| 6,431,339 | B1 | * | 8/2002 | Beattie et al. ........... 192/220.4 |

* cited by examiner

*Primary Examiner*—Richard Ridley
*Assistant Examiner*—Colby Hansen
(74) *Attorney, Agent, or Firm*—McGinn IP Law Group, PLLC (57) ABSTRACT

In a select system for an automatic transmission in which switchover between a mechanical automatic mode and an electrical manual mode is achieved by a lateral shift of a select lever, the select lever has an engaging protrusion extending a distance to one side, which remains inserted in an engaging groove opened in a rotatable linkage member. When the select lever is in the automatic mode, the linkage member is rotatable with the lever operation by engagement between the engaging protrusion and a part of the engaging groove so as to achieve mechanical transmission control of the automatic transmission. When the select lever is in the manual mode, the engaging protrusion, while disengaging from the part of the engaging groove, restricts rotation of the linkage member so as to prevent the mechanical transmission control. Thus, the select system can prevent an accidental release of the select lever from a gear position or an unexpected shift change of the automatic transmission, whether it is in the A/T mode or manual mode.

3 Claims, 8 Drawing Sheets

PRIOR ART

SELECT SYSTEM FOR AN AUTOMATIC TRANSMISSION

BACKGROUND OF THE INVENTION

The present invention relates to a select system for an automatic transmission.

The present application claims priority from Japanese Patent Application No. 2002-189359, the disclosure of which is incorporated herein by reference.

Figure 7:
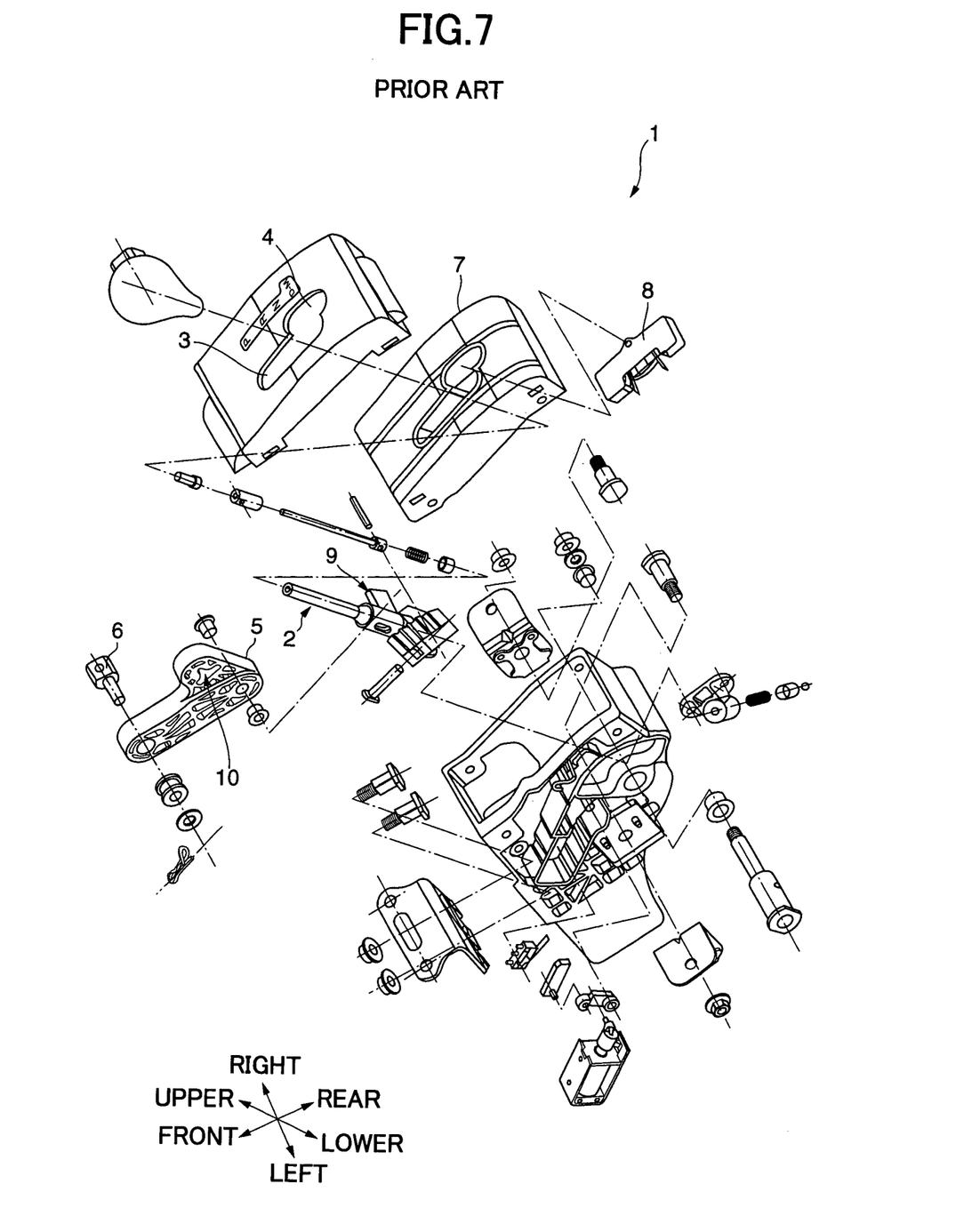
FIG. 7 is the exploded and perspective view illustrating the structure of a conventional select system for the automatic transmission.
Figure 8:
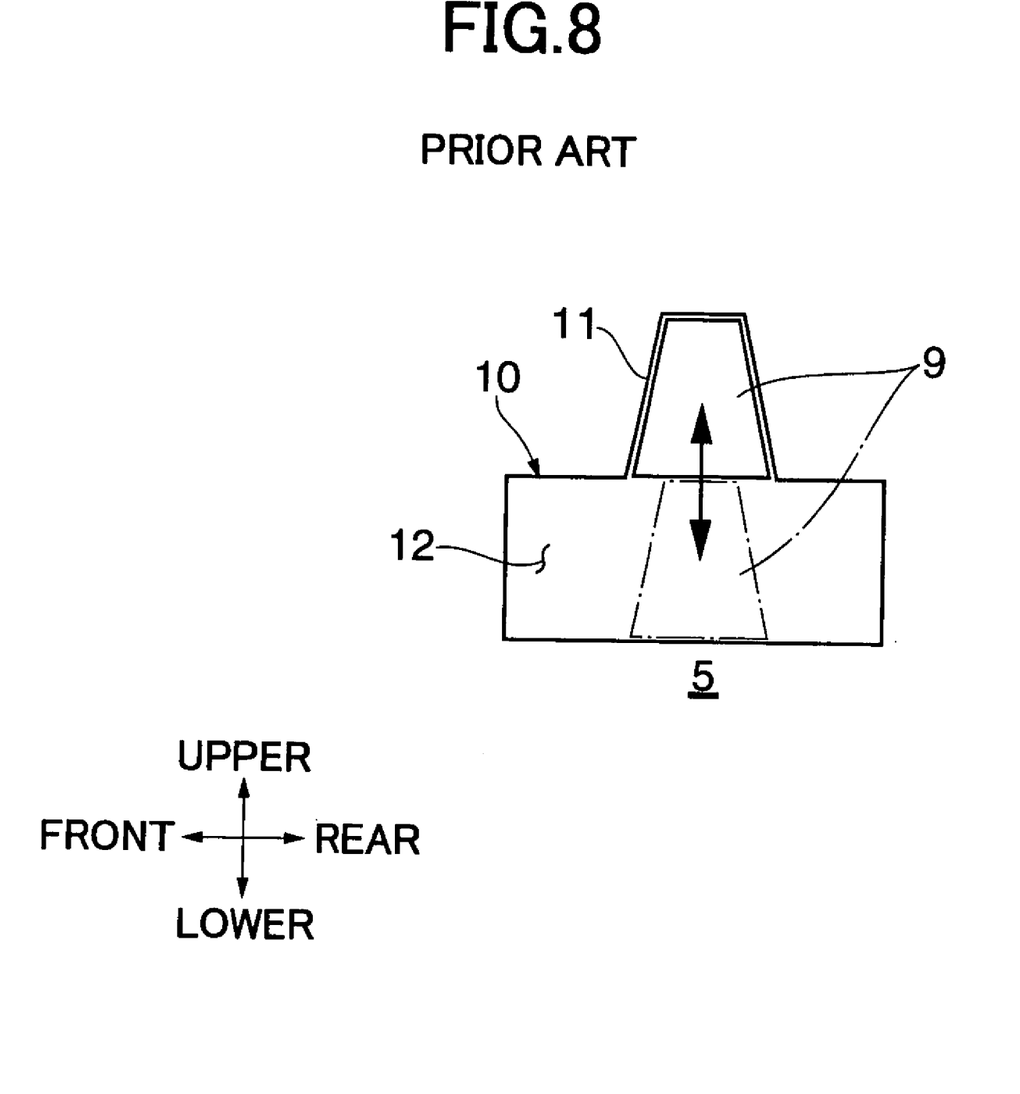
FIG. 8 is the enlarged view of the part of the select system of FIG. 7.

FIG. 7 and FIG. 8 illustrate a known select system 1 for the automatic transmission. A select lever 2 is shifted to the left and right for switching over between an automatic transmission mode (hereinafter referred to as "A/T mode") 3 and a manual transmission mode (hereinafter referred to as "manual mode") 4. Generally, when the select lever 2 is in the A/T mode 3, a linkage member 5 which is operatively connected to the select lever 2 extends and retracts a selector cable (not shown) which is connected to an inhibitor (range) switch of the automatic transmission (not shown), via an end member 6, whereby an automatic transmission control is achieved. For the manual transmission control of the automatic transmission, the select lever 2 is first shifted in the D range position of the A/T mode 3 and then to the right as shown in FIG. 7 into the manual mode 4. A forward or backward shift of the lever in this mode turns on a switch 8 in an upper case 7 either to shift up or to shift down.

The select system 1 includes the following structure so that the linkage member 5 is maintained in the D range position while allowing the select lever 2 to be shifted in the manual mode 4, after switching over the select lever 2 from the A/T mode 3 to the manual mode 4.

The select lever 2 is integrally formed with a rod 9 which is tapered as shown in a side cross section and protrudes from one side face of the lever 2 toward the other side as shown in FIGS. 7 and 8. The linkage member 5 includes a guide groove 10 having a shape bulged in the middle as shown in the side cross section in a corresponding position to receive the rod 9. When the select lever 2 is in the A/T mode 3, the rod 9 fits into a tapered rod receiving hole 11 opened at the top in the center of the guide groove 10 so that the linkage member 5 is rotated with the lever shift. When the select lever 2 is switched over from the A/T mode 3 to the manual mode 4, the rod 9 is retracted into an elongated groove 12 which opens to the front and back continuously with the lower end of the rod receiving hole 11, thus being freed from the engagement. In this state; the linkage member 5 is not rotated when the select lever 2 is moved.

In the select system 1, the rod 9 of the select lever 2 is tapered for an easy engagement and is removal from the rod receiving hole 11 of the guide groove 10 opened in the linkage member 5. One problem with such a system was that the rod 9 of the select lever 2 sometimes disengages from the rod receiving hole 11 of the linkage member 5 due to external factors such as vibrations while running on a dirt course or a gravel road, leading to an unexpected shift change from the A/T mode 3 to the manual mode 4.

Moreover, because the linkage member 5 is released from the select lever 2 in the manual mode 4 and not inhibited from rotating, it could accidentally be rotated due to the aforementioned external factors. A rotation of the linkage member 5 leads to a forcible shift change of the automatic transmission even when the select lever 2 is in the manual mode 4; thus an accidental release of the select lever 2 from the gear position or an unexpected gear change could occur during the drive in the manual mode.

SUMMARY OF THE INVENTION

In order to overcome problems encountered by a conventional select system for an automatic transmission, it is an object of the present invention to provide a select system which, irrespective of the driving mode, prevents an accidental release of an engagement between a select lever and a linkage member, which may be caused by external factors such as vibrations during a drive on a dirt course or a gravel road, or internal factors such as engagement conditions between the select lever and linkage member. The select system will thereby prevent an accidental release of the select lever from a desired gear position or an unexpected shift change of the automatic transmission.

According to the present invention, in the select system for the automatic transmission in which a switchover between a mechanical automatic mode and an electrical manual mode is achieved by a lateral shift of the select lever, the system includes an engaging protrusion provided to the select lever and extended to a predetermined distance for one side, and a rotatable linkage member in which an engaging groove is opened through which the engaging protrusion is inserted. When the select lever is in the automatic mode, the linkage member is rotatable with a shifting movement of the select lever by engagement between the engaging protrusion and a part of the engaging groove so as to achieve a mechanical transmission control of the automatic transmission. When the select lever is in the manual mode, the engaging protrusion, while disengaging from the part, restricts an accidental rotation of the linkage member so as to avoid the mechanical transmission control of the automatic transmission.

In the present select system, the engaging groove may have a substantially convex shape protruded upwardly seen in a side view, including a hollow square upper groove having an open bottom and a hollow rectangular lower groove continuous with the upper groove. When the select lever is in the automatic mode, the engaging protrusion fits in the upper groove.

Further in the present select system, the engaging protrusion may have the substantially convex shape as shown in the side view, including a rectangular lower protrusion extending in a front-to-back direction and a square upper protrusion protruded upwardly from the lower protrusion. When the select lever is in the manual mode, the upper protrusion is movable within the upper groove at a distance larger than a switching stroke of the manual mode.

Moreover, when the select lever is in the manual mode, the linkage member is movable relative to the engaging protrusion at the distance smaller than a moving amount of the linkage member necessary to achieve the mechanical transmission control of the automatic transmission.

BRIEF DESCRIPTION OF THE DRAWINGS

These and other objects and advantages of the present invention will become understood from the following description with reference to the accompanying drawings, wherein.

DETAILED DESCRIPTION OF THE PREFERRED EMBODIMENTS

Preferred embodiments of the present invention will be hereinafter described with reference to FIG. 1 to FIG. 6.

As shown in FIG. 1 through FIG. 6, a select system 14 for an automatic transmission according to the present invention has a select lever 15, a lower case 16, an upper case 17, and a linkage member 18. Shifting the select lever 15 in left and right directions (orthogonal to the plane of FIG. 1) switches between an A/T mode for mechanical positioning and a manual mode for electrical positioning. The lower case 16 to which the select lever 15 is mounted has a box-like shape having an open top and accommodates therein the linkage member 18, a shift lock mechanism 19 for retaining the lever in a selected position, a clicking gear shift mechanism 20, and a mechanism for preventing an erroneous operation, which will all be described in more detail later. The upper case 17 closes the open top of the lower case 16. Both the upper case 17 and an indicator 21 are formed with selector grooves 22 for selecting a gear range position. The linkage member 18 is operatively connected to the select lever 15 which is shifted along the selector grooves 22 to extend or retract a selector cable 25 connected to an arm 80 of an inhibitor (range) switch 24 of an automatic transmission 23, whereby an automatic transmission control is achieved.

The select system 14 is mounted on an instrument panel (not shown) beside a steering column using mounting brackets 27, 28, 29 fixedly coupled to a support beam 26 which extends across the vehicle body. A reference numeral 30 denotes a floor tunnel.

A further description of each element of the select system 14 will be made below, starting from the select lever 15.

Figure 1:
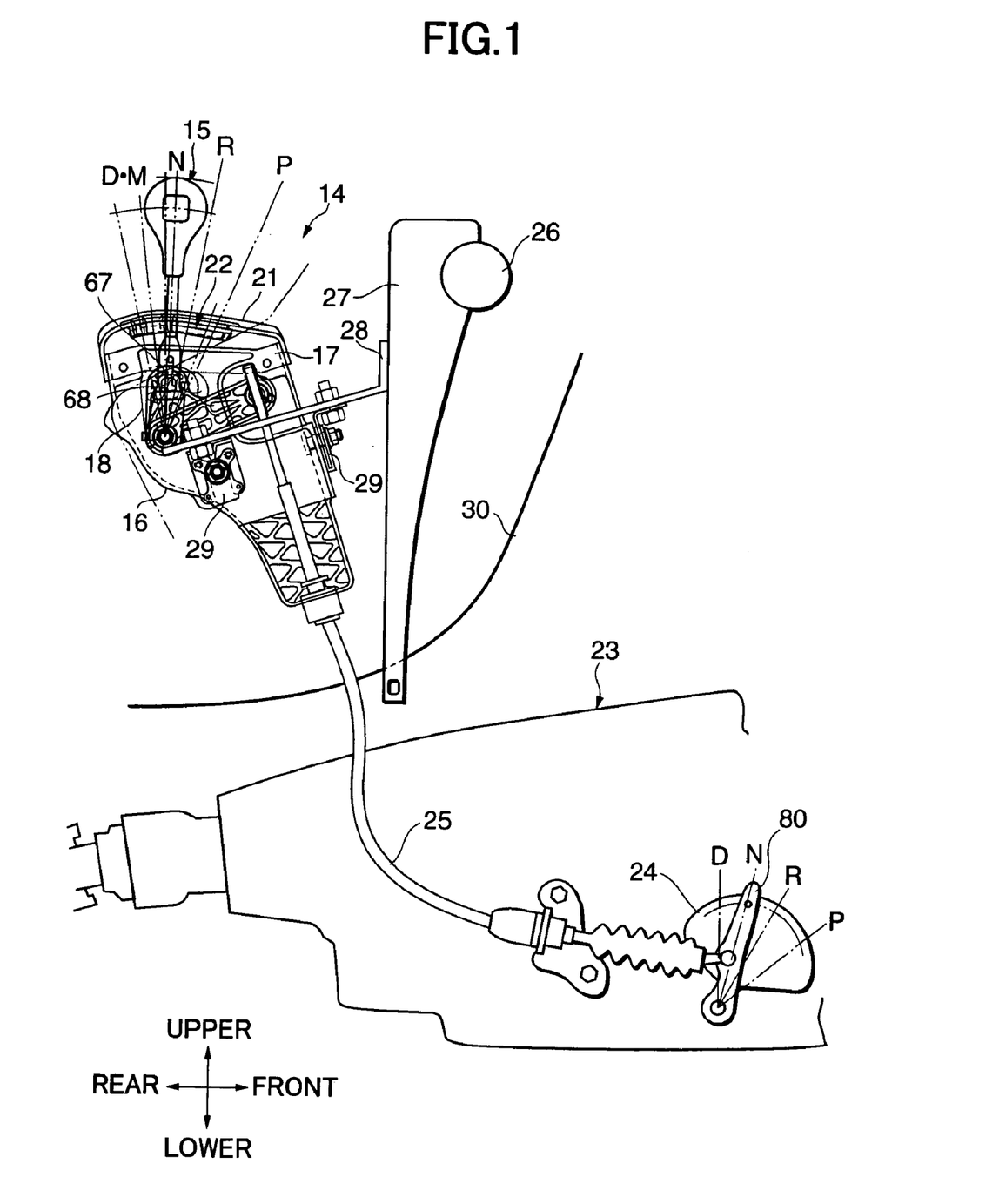
FIG. 1 is a view illustrating an entire structure of a select system for an automatic transmission according to the present invention.
Figure 2:
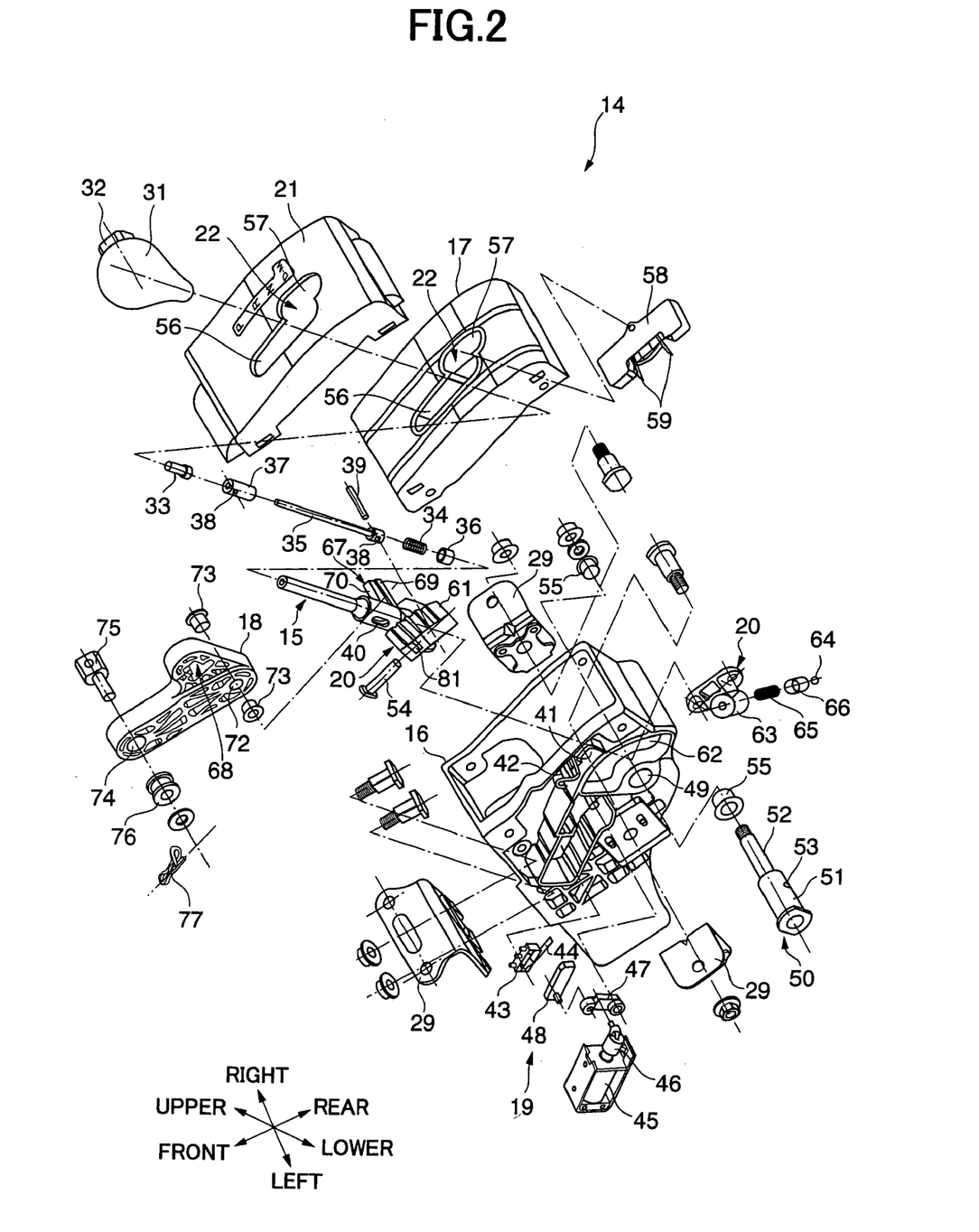
FIG. 2 is an exploded and perspective view illustrating the structure of the select system.

The select lever 15 is a tubular member swaged into a predetermined shape, and a grip 31 is attached to its top as shown in FIG. 2. The grip 31 has a push button 32 on one side, which is provided for the purpose of releasing the restriction on the movement of the select lever 15 in directions in which it is shifted from the P to R range position, an N to R range position, and an R to P range position. Pushing the push button 32 presses a rod 35 downwardly via a slide pin 33 against the urging force of a spring 34 inside the select lever 15. The spring 34 is retained within the select lever 15 by a spring receiver 36.

To the lower end of the rod 35 is coupled a cylindrical collar 37 which contains the upper circumference of the spring 34. A lock pin 39 passes through holes 38, 38 respectively provided in the rod 35 and the collar 37. With the select lever 15 mounted in the lower case 16, either end of the lock pin 39 protrudes from slits 40 formed in the left and right side faces of the select lever 15 such as to be freely movable in up and down directions. Thus both ends of the lock pin 39 move downwardly when the rod 35 is pressed down.

The left end of the lock pin 39 extends through an opening 41 at a predetermined location in the left side wall of the lower case 16 toward the outside of the case. When the rod 35 is pushed up, the lock pin 39 engages with one of a plurality of steps 42 formed along the upper edge of the opening 41. The steps 42 form protrusions corresponding to the P, R, N, and D range positions of the select lever 15 from the front. Further, these protrusions are stepped so that the lever cannot be shifted from P to R range position, N to R range position, and R to P range position unless the push button 32 of the grip 31 is pressed. The engagement between the lock pin 39 and the step 42 is not released until the push button 32 is pressed, so that the erroneous operation of the select lever 15 is prevented.

The opening 41 is formed such that the left end of the lock pin 39 is released therefrom when the select lever 15 is shifted from the D range position of the A/T mode to the manual mode.

When the select lever 15 is shifted from the R to P range position and the push button 32 of the grip 31 is released, the left end of the lock pin 39 moves upwardly and engages with the step 42 corresponding to the P range position, as well as pressing a sensor 44 of a parking switch 43 arranged adjacent to the opening 41. A detection signal is thereby output to a control unit which is not shown. Upon receiving the input, the control unit causes a plunger 46 of a shift lock solenoid 45 located diagonally below the opening 41 to extend and retract. The tip of the plunger 46 is coupled to a middle portion of a rotation arm 47, so that, when the plunger 46 is extended, the arm 47 turns a preset angle in the clockwise direction in FIG. 4, sliding a slide plate 48 toward below the lock pin 39. The shift lock mechanism 19 for retaining the lock pin 39 is thus constituted. The control unit causes the plunger 46 of the shift lock solenoid 45 to retract only when an ignition switch is at an ON position and a brake pedal is being depressed, so that the slide plate 48 is moved away from below the lock pin 39 to allow the select lever 15 which has been locked in the P range position to be shifted to the other range positions.

The lower end of the select lever 15 is bifurcated. Between the bifurcated legs is the large-diameter part 51 of a step bolt 50 passing substantially horizontally through a bolt hole 49 at a predetermined location in the left side wall of the lower case 16 and another bolt hole (not shown) in the right side wall. The small-diameter part 52 of the step bolt 50 passes through the linkage member 18 to be described later such that the linkage member 18 can turn around it. The step bolt 50 is fixed to the bifurcated legs of the select lever 15 with a retention pin 54 passing through holes 53 respectively formed in the large-diameter part 51 and the bifurcated legs. The retention pin 54 extends orthogonally to the step bolt 50. The step bolt 50 is rotatably supported at either end by collars 55, 55 on the side walls of the lower case 16.

Thus the select lever 15 can be rotated back and forth relative to the lower case 16 in the position offset to the left side wall of the lower case 16, and it can also be tilted toward left and right. This allows the lever operation along the selector grooves 22 in the upper case 17 over the lower case 16 and the indicator 21 between various range positions.

The upper case 17 and indicator 21 will be described as follows.

As shown in FIG. 2, the selector groove 22 respectively formed in the upper case 17 and the indicator 21 includes a long groove 56 extending in the front-to-back direction and a parallel short groove 57 continuing from the rear end of the long groove on its right side. The long groove 56 covers the A/T mode having four, P, R, N, and D range positions from the front, and the short groove 57 is for the manual mode having three, shift up, D, and shift down range positions from the front. After shifting the select lever 15 from the D range position of the A/T mode to the right into the D range position of the manual mode, a forward or backward shift of the lever 15 turns on either one of the sensors 59, 59 of the switch 58 arranged at a certain location on the backside of the upper case 17 for shift up or shift down operations. The select lever 15 requires a stroke of at least about 10 mm in each direction to turn on the switch 58. The sensor 59 outputs a detection signal to the control unit (not shown), which then causes the automatic transmission 23 to be operated manually.

At the lower end on the left side of the select lever 15 is integrally formed a resin knotted member 61 having a plurality of grooves on its upper side extending left and right. The knotted member 61 forms a part of the clicking gear shift mechanism 20. When the select lever 15 is mounted on the lower case 16, the knotted member 61 protrudes to the outside of the case from an opening 62 having a fan-like shape as seen in a side view located at a given position on the left side wall of the lower case 16. A ball 64 inside a case holder 63 attached at a predetermined location on the left side wall of the lower case 16 engages from above with the grooves, thus giving click motions when the select lever 15 is shifted in a certain position.

Figure 3:
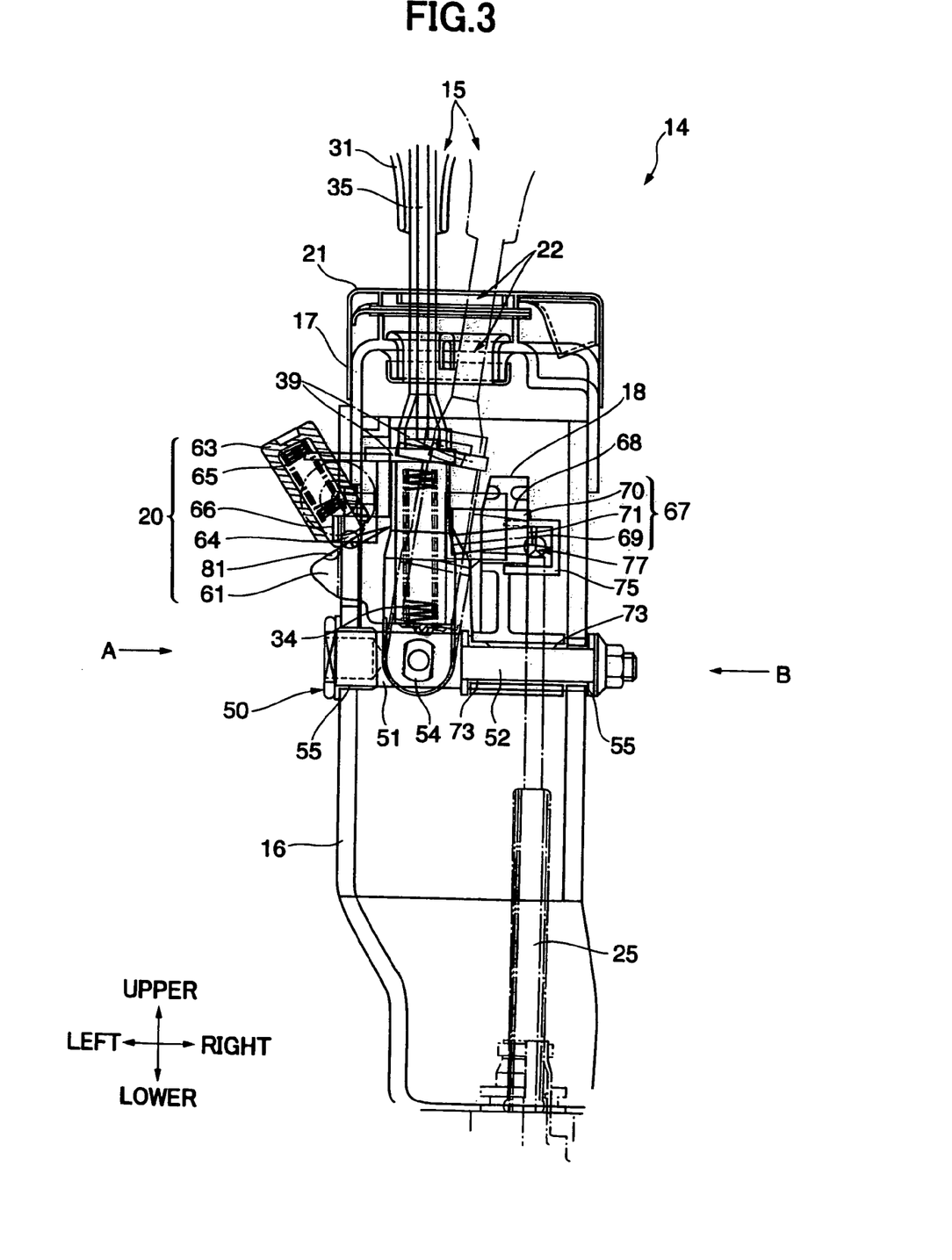
FIG. 3 is a front view of the select system viewed from an inside of a vehicle compartment.
Figure 4:
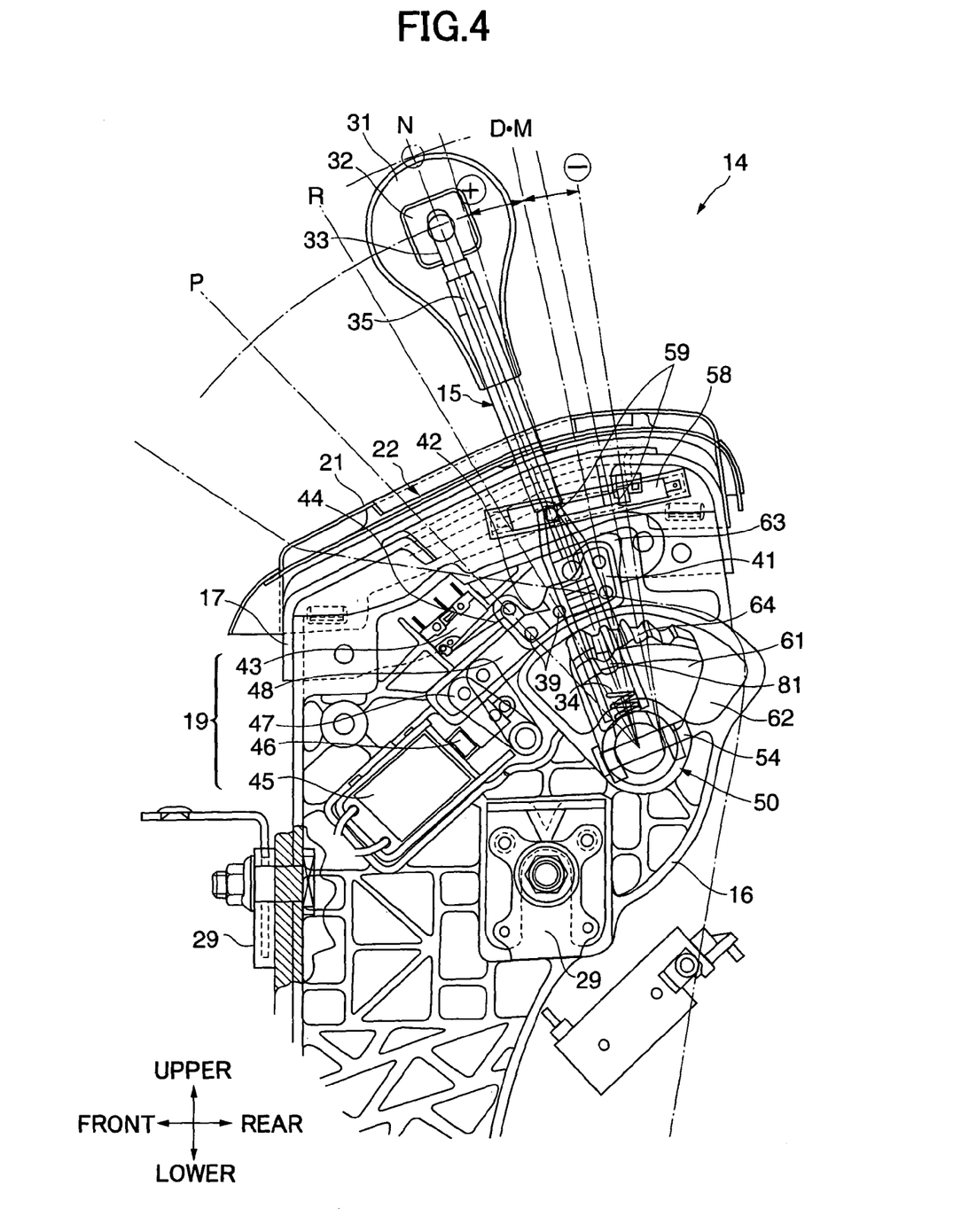
FIG. 4 is a left side view of the select system viewed from a direction of an arrow A of FIG. 3.

The case holder 63 forms the other part of the clicking gear shift mechanism 20 and includes a spring 65 with a collar 66 for biasing the ball 64 downwardly. When, for example, the select lever 15 is shifted in the N range position of the A/T mode as shown in FIG. 4, the ball 64 engages with the groove which is second from the front of the knotted member 61, thus giving a suitable click motion. The frontmost groove of the knotted member 61, in particular, with which the ball 64 engages when the select lever 15 is shifted in the D range position of the A/T mode, is formed with a boss and a semispherical dent 81 at the left end as shown in FIG. 3.

The click motion is thus obtained when shifting the select lever 15 left and right to switch over between the A/T and manual modes, with the ball 64 riding over the boss and fitting in the dent 81. The engagement between the ball 64 and dent 81 also restricts the tilting angle of the select lever 15 when it is shifted to the right into the manual mode.

On the right side at the lower end of the select lever 15 is integrally formed a stopper 67 having a convex shape as shown in the side view and extending a certain distance to the right. When the select lever 15 is upright in the A/T mode, an upper surface of the stopper 67 is substantially horizontal, while a lower surface is diagonally upwardly to the right. When the select lever 15 is tilted into the manual mode, its upper surface is diagonally downwardly to the right, while the lower surface is substantially horizontal.

The extended end of the stopper 67 always remains inside a corresponding groove 68 formed at a preset location of the linkage member 18. While the select lever 15 is in the A/T mode, the stopper 67 engages with the part of the groove 68 in the linkage member 18, thereby causing the linkage member 18 to rotate around the step bolt 50 with the lever operation, so as to extend or retract the selector cable 25. While the select lever 15 is in the manual mode, the stopper 67 disengages from the part of the groove 68 but prevents the linkage member 18 from accidentally rotating, so that the lever can be moved in the shift-up or shift-down direction.

The engagement between the stopper 67 and groove 68 will be described in more details below.

Figure 5:
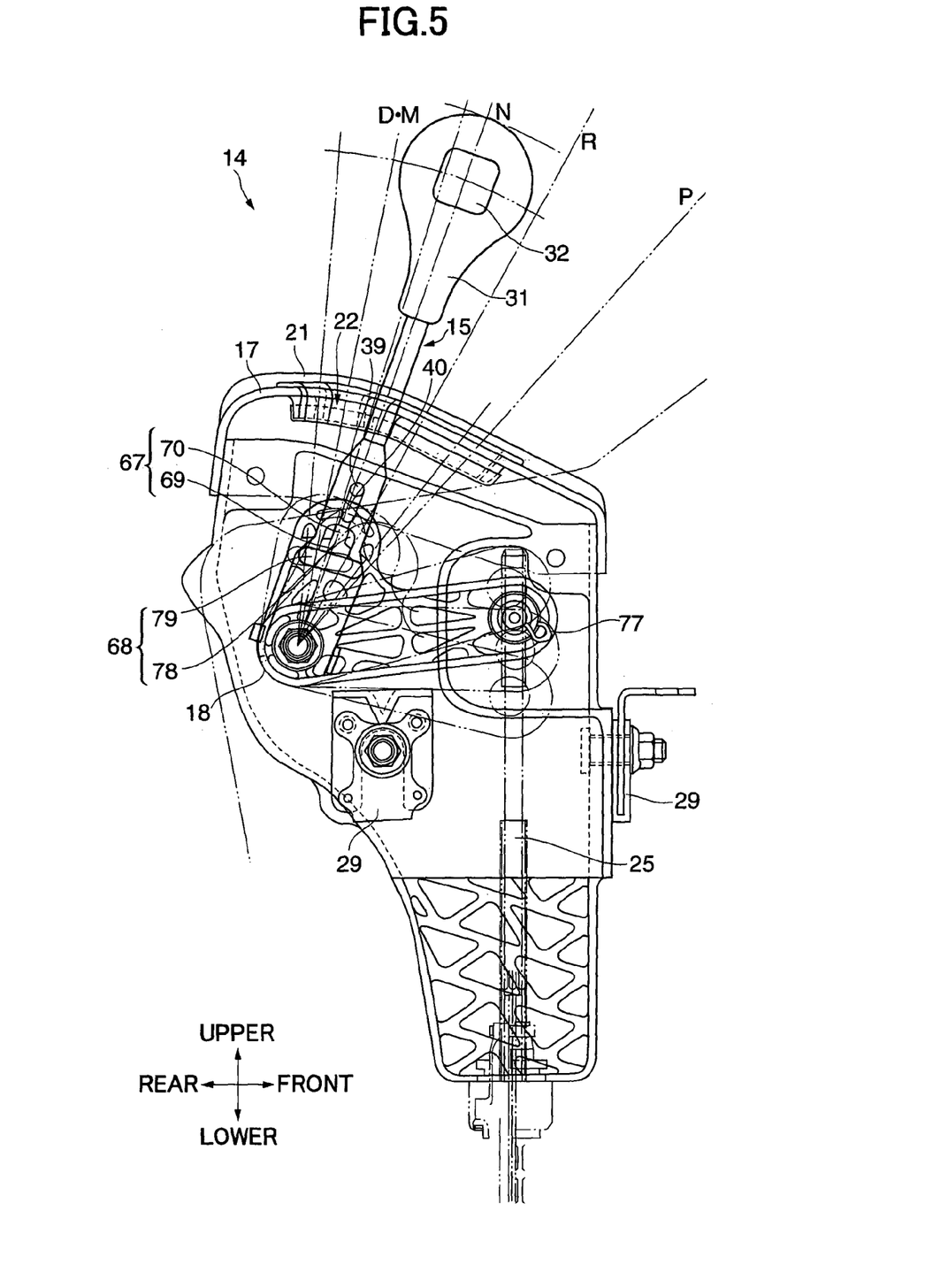
FIG. 5 is a right side view of the select system viewed from the direction of the arrow B of FIG. 3.
Figure 6:
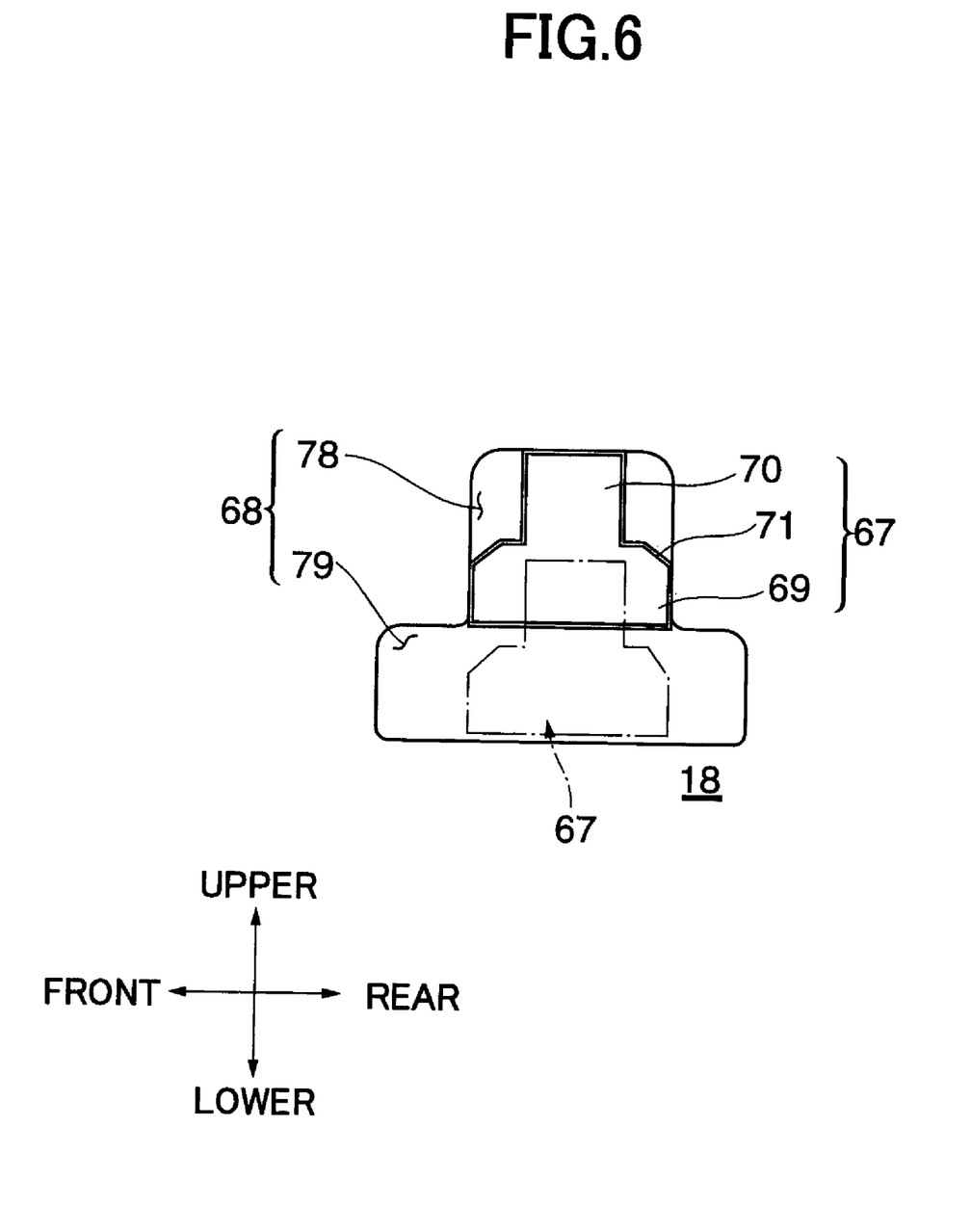
FIG. 6 is an enlarged view of a part of the select system.

As shown in FIGS. 5 and 6, the stopper 67 has a convex shape as shown in the side view, being made up of a rectangular lower stopper 69 extending in the front-to-back direction and a square upper stopper 70 with a predetermined width protruded upwardly from the midpoint of the lower stopper 69. These extend in the left and right directions such that the stopper 67 has a decreasing height from the side of the select lever 15 to the extended end (right side of FIG. 3). Thus, when the upright select lever 15 is tilted into the manual mode, the upper surface of the upper stopper 70 is tilted from horizontal downwardly to the right, while the lower surface of the lower stopper 69, which has been tilted upwardly to the right, is made horizontal. The front and rear edges of the lower stopper 69 are provided with suitable chamfers 71. The extended end of the stopper 67 remains inside the groove 68 of the linkage member 18 irrespective of the position of the select lever 15.

The linkage member 18 is a resin-made, rotatable part being substantially L-shaped in side view as shown in FIG. 2. At the lower rear end is a through hole 72 of a predetermined diameter, through which the small diameter part 52 of the step bolt 50 passes via collars 73, 73, whereby the linkage member 18 can rotate around the step bolt 50. Another through hole 74 formed to the front of the through hole 72 in the linkage member 18 is for mounting an end member 75 with a rubber bush 76 so as to be rotatable, for coupling the linkage member 18 to the selector cable 25 connected to the automatic transmission 23. The end member 75 is retained there with a split pin 77. Above the through hole 72 in the linkage member 18 is formed the aforementioned groove 68 which has a substantially convex shape in side view.

The groove 68 includes a hollow square upper groove 78 with an open bottom and a hollow rectangular lower groove 79 continuous with the open bottom of the upper groove 78.

The upper groove 78 has such dimensions as to allow a smooth engagement and a release of the stopper 67 which moves up from below as the select lever 15 is changed over from the D range position of the manual mode to that of the A/T mode. More specifically, the dimensions are set such that the width in the front-to-back direction of the upper groove 78 is slightly larger than the front-to-back length of the lower stopper 69, and the height is likewise slightly larger than the entire height of the stopper 67. Thus, when the stopper 67 is inserted in the upper groove 78, the upper surface of the upper stopper 70 and front and rear end faces of the lower stopper 69 are brought into a tight engagement with the upper groove 78. Moving the stopper 67 engaging with the upper groove 78 by a stroke of about 15 mm to the front or back shifts the select lever 15 in one of the front and back positions. Meanwhile, as the linkage member 18 is rotatable in this state, the automatic transmission 23 performs the automatic transmission control in accordance with the range position of the select lever 15.

The stopper 67 moves down when the select lever 15 is changed over from the D range position of the A/T mode to that of the manual mode, but the upper stopper 70 remains protruded toward inside the upper groove 78. The width of the upper groove 78 is set to be large enough to allow a free movement of the upper stopper 70 a distance corresponding to the switching stroke of the switch 58, about 10 mm, back and forth respectively. Thus in the manual mode, while the lower stopper 69 comes out of the engagement with the upper groove 78, the upper stopper 70 remains protruded inside the upper groove 78, whereby the lever operation in shift-up or shift-down positions is possible while a rotation of the linkage member 18 is restricted.

The lower groove 79 has such dimensions as to allow the free movement of the lower stopper 69 which has moved downwardly as the select lever 15 is changed over from the D range position of the A/T mode to that of the manual mode in the front-to-back direction by a certain distance. The free movement of the lower stopper 69 by the certain distance is caused by the upper stopper 70 which remains protruded inside the upper groove 78. More specifically, the dimensions are set such that the width in the front-to-back direction of the lower groove 79 is large enough to cover the moving distance of the lower stopper 69 or the switching stroke of the switch 58, which is about 10 mm in each direction. In addition, the height of the lower groove is slightly larger than the height of the lower stopper 69 including the chamfers 71.

Furthermore, the dimensions of the grooves 78 and 79 are determined such as to prevent the select lever 15 in the manual mode from being accidentally shifted in front or back position even if the linkage member 18 is rotated by an external factor. That is, the groove dimensions are determined such that, in the manual mode where the stopper 67 remains protruded inside the upper groove 78, the linkage member 18 can only move relative to the stopper 67 a distance which is smaller than the stroke necessary to allow the select lever 15 to be shifted in a front or back position, which is about 15 mm in each direction.

According to the select system 14 described above, the stopper 67 provided on the right side of the select lever 15 always remains inserted in the groove 68 formed in the linkage member 18. To allow easy engagement with and removal from the upper groove 78, the stopper 67 has a convex shape as shown in the side view. When the select lever 15 is tilted to switch over from the A/T mode to the manual mode, the upper stopper 70 comes out of the engagement with the upper groove 78, but remains protruded inside the upper groove 78. Because the stopper 67 is separated from the upper groove 78, the upper stopper 70 can move back and forth freely when the select lever 15 is shifted to the front or back, whereby the switch 58 is turned on either to shift up or to shift down.

Even if the stopper 67 comes off from the upper groove 78 during the drive in the A/T mode due to some external factor such as impact by vibrations or splattering gravel, the upper stopper 70 remains protruded inside the upper groove 78, whereby restricting rotation of the linkage member 18, and preventing an unexpected shift change from the A/T mode to the manual mode.

During the drive in the manual mode, likewise, the linkage member 18 is inhibited from rotating even with the above external factors, because of the upper stopper 70 protruding inside the upper groove 78. Thus the situation encountered in prior arts is prevented, in which the automatic transmission 23 forcibly changes the gear positions during the drive in the manual mode.

As described above, according to the select system for an automatic transmission of the present invention, whether it is in the A/T mode or manual mode, an accidental release of engagements between the select lever and linkage member resulting from the external factors such as the large vibrations during the drive on the dirt course or splattering gravel, or the internal factors such as the condition of the engagements between the select lever and the linkage member, is prevented. The select system thus prevents an accidental release of the select lever from the gear position or an unexpected shift change of the automatic transmission.

While there have been described what are at present considered to be preferred embodiments of the present invention, it will be understood that various modifications may be made thereto, and it is intended that the appended claims cover all such modifications as fall within the true spirit and scope of the present invention.

What is claimed is:

1. A select system for an automatic transmission having a select lever switching over between a mechanical automatic mode and an electrical manual mode, comprising:
    a single engaging protrusion provided to said select lever and extended for a predetermined distance to one side, said engaging protrusion comprising an upper protrusion and a lower protrusion; and
    a rotatable linkage member having an engaging groove for inserting said engaging protrusion therein, wherein when said select lever is in the automatic mode, said linkage member is rotatable with a shifting movement of said select lever by an engagement between said engaging protrusion and a part of said engaging groove so as to achieve mechanical transmission control of said automatic transmission, and
    when said select lever is in the manual mode, said lower protrusion disengages from the part of said engaging groove and said upper protrusion restricts movement of said linkage member relative to said engaging protrusion within a predetermined distance smaller than a moving stroke of said linkage member necessary to achieve the mechanical transmission control of said automatic transmission, wherein said engaging groove has a substantially convex shape in a side view of said automatic transmission protruded upwardly, said engaging groove comprising:
    a hollow upper groove corresponding to said upper protrusion having an open bottom; and
    a hollow lower groove corresponding to said lower protrusion continuous with the upper groove,
    wherein said upper protrusion fits in said upper groove when said select lever is in the automatic mode.

2. A select system for an automatic transmission having a select lever switching over between a mechanical automatic mode and an electrical manual mode, comprising:
    a single engaging protrusion provided to said select lever and extended for a predetermined distance to one side; and
    a rotatable linkage member having an engaging groove for inserting said engaging protrusion therein,
    wherein when said select lever is in the automatic mode, said linkage member is rotatable with a shifting movement of said select lever by an engagement between said engaging protrusion and a part of said engaging groove so as to achieve mechanical transmission control of said automatic transmission,
    wherein when said select lever is in the manual mode, said engaging protrusion restricts an accidental rotation of the linkage member so as to avoid the mechanical transmission control of the automatic, while said engaging protrusion disengaging from the of said engaging groove,
    wherein said engaging groove has a substantially convex shape in a side view of said automatic transmission protruded upwardly, said engaging groove comprising:
    a hollow square upper having an open bottom; and
    a hollow rectangular lower groove continuous with the upper groove,
    wherein said engaging protrusion fits in said upper groove when said selector lever is in the automatic mode, and
    wherein said engaging protrusion has a substantially convex shape in a side view of said automatic transmission with a rectangular lower protrusion extending in a front-to-back direction and a square upper protrusion protruded upwardly from the lower protrusion, wherein said upper protrusion is movable within a predetermined distance of said upper groove larger than a switching stroke of the manual mode when said select lever is in the manual mode.

3. A select system for an automatic transmission having a select lever switching over between a mechanical automatic mode and an electrical manual mode, comprising:

a single engaging protrusion provided to said select lever and extended for a predetermined distance to one side; and a rotatable linkage member having an engaging groove for inserting said engaging protrusion therein, wherein when said select lever is in the automatic mode, said linkage member is rotatable with a shifting movement of said select lever by an engagement between said engaging protrusion and a part of said engaging groove so as to achieve mechanical transmission control of said automatic transmission, wherein when said select lever is in the automatic mode, said engaging protrusion restricts an accidental rotation of the linkage member so as to avoid the mechanical transmission control of the automatic transmission, while said engaging protrusion disengages from the part of the engaging groove, wherein said engaging groove has a substantially convex shape in a side view of said automatic transmission protruded upwardly, said engaging groove comprising:

a hollow square upper groove having an open bottom; and a hollow rectangular lower groove continuous with the upper groove, wherein said engaging protrusion fits in said upper groove when said select lever is in the automatic mode, and wherein said engaging protrusion has a substantially convex shape in a side view of said automatic transmission with a rectangular lower protrusion extending in a front-to-back direction and a square upper protrusion protruded upwardly from the lower protrusion, wherein said linkage member is movable relative to said engaging protrusion within a predetermined distance smaller than a moving stroke of said linkage member necessary to achieve the mechanical transmission control of said automatic transmission when said select lever is in the manual mode.

* * * * *